(12) United States Patent
Guo

(10) Patent No.: US 8,934,221 B2
(45) Date of Patent: Jan. 13, 2015

(54) ELECTRONIC DEVICE WITH SUPPORT MECHANISM

(75) Inventor: Ji-Bing Guo, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/588,095

(22) Filed: Aug. 17, 2012

(65) Prior Publication Data

US 2013/0242472 A1 Sep. 19, 2013

(30) Foreign Application Priority Data

Mar. 16, 2012 (CN) .......................... 2012 1 0069266

(51) Int. Cl.
*H05K 5/00* (2006.01)
*H05K 7/00* (2006.01)
*G11B 33/02* (2006.01)
*E04G 3/00* (2006.01)
*A47B 96/06* (2006.01)
*E05C 5/02* (2006.01)

(52) U.S. Cl.
USPC ............ 361/679.01; 361/679.03; 361/679.04; 361/679.06; 369/75.21; 248/316.5; 248/229.22; 292/8; 292/341.17; 74/142

(58) Field of Classification Search
CPC ..... G06F 1/16; G06F 1/33225; H05K 5/0026; H05K 5/026; H05K 2201/10159

USPC ............................ 361/679.3, 679.01–679.09, 361/679.1–679.19, 679.31–679.45, 361/679.55–679.6, 724–747; 345/156, 157, 345/168, 169, 184; 455/575.1, 575.3, 455/575.4, 575.8; 248/80–88, 155.1–155.5, 248/166–173, 180.1–186.2, 229.1–231.51, 248/271.4, 292.14, 316.1–316.8; 292/1–62, 292/113, 169.11–169.23, 341.11–341.19; 74/141–169, 380–387
See application file for complete search history.

(56) References Cited

U.S. PATENT DOCUMENTS 6,975,507 B2 * 12/2005 Wang et al. .............. 361/679.21
2006/0185563 A1 * 8/2006 Sweere et al. ................. 108/28

* cited by examiner

*Primary Examiner* — Jerry Wu
(74) *Attorney, Agent, or Firm* — Novak Druce Connolly Bove + Quigg LLP

(57) ABSTRACT

An electronic device includes a housing, a display and a support mechanism. The housing includes a bottom plate and a peripheral wall. The display screen is mounted to the housing and positioned above the bottom plate. The support mechanism is movably and adjustably assembled to the bottom plate of the housing, away from the display screen. The support mechanism includes a retracting assembly and a support assembly. The retracting assembly is releasably mounted to the bottom plate and received within the housing. The support assembly is rotatably hinged to the bottom plate of the housing, and further hinges with the retracting assembly for supporting the housing at different viewing angles.

9 Claims, 7 Drawing Sheets

ELECTRONIC DEVICE WITH SUPPORT MECHANISM

BACKGROUND

1. Technical Field

This disclosure relates to electronic devices and a support mechanism applied to the electronic device.

2. Description of Related Art

An electronic device, such as a digital photo frame, or an e-book, has a display screen and a support mechanism for supporting the display screen. A common support mechanism is a support rod directly hinged to the back surface of the display screen. However, in use, the support mechanism is unable to adjust the viewing angle of the display screen as the user viewing requirement changes.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the present disclosure. Moreover, in the drawings, like reference numerals designate corresponding parts throughout the several views. Wherever possible, the same reference numerals are used throughout the drawings to refer to the same or like elements of an embodiment.

DETAILED DESCRIPTION

Figure 1:
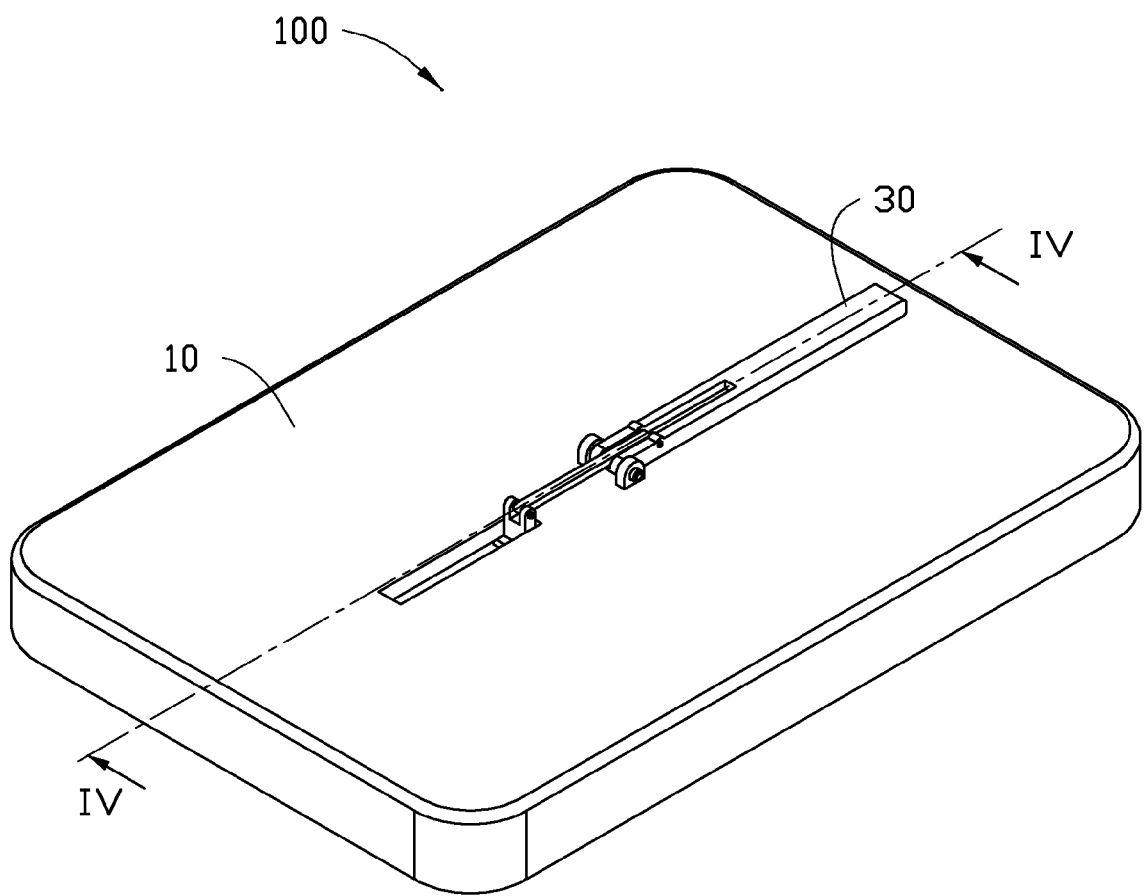
FIG. 1 is an assembled, isometric view of an embodiment of an electronic device equipped with a support mechanism, which is not being used.
Figure 2:
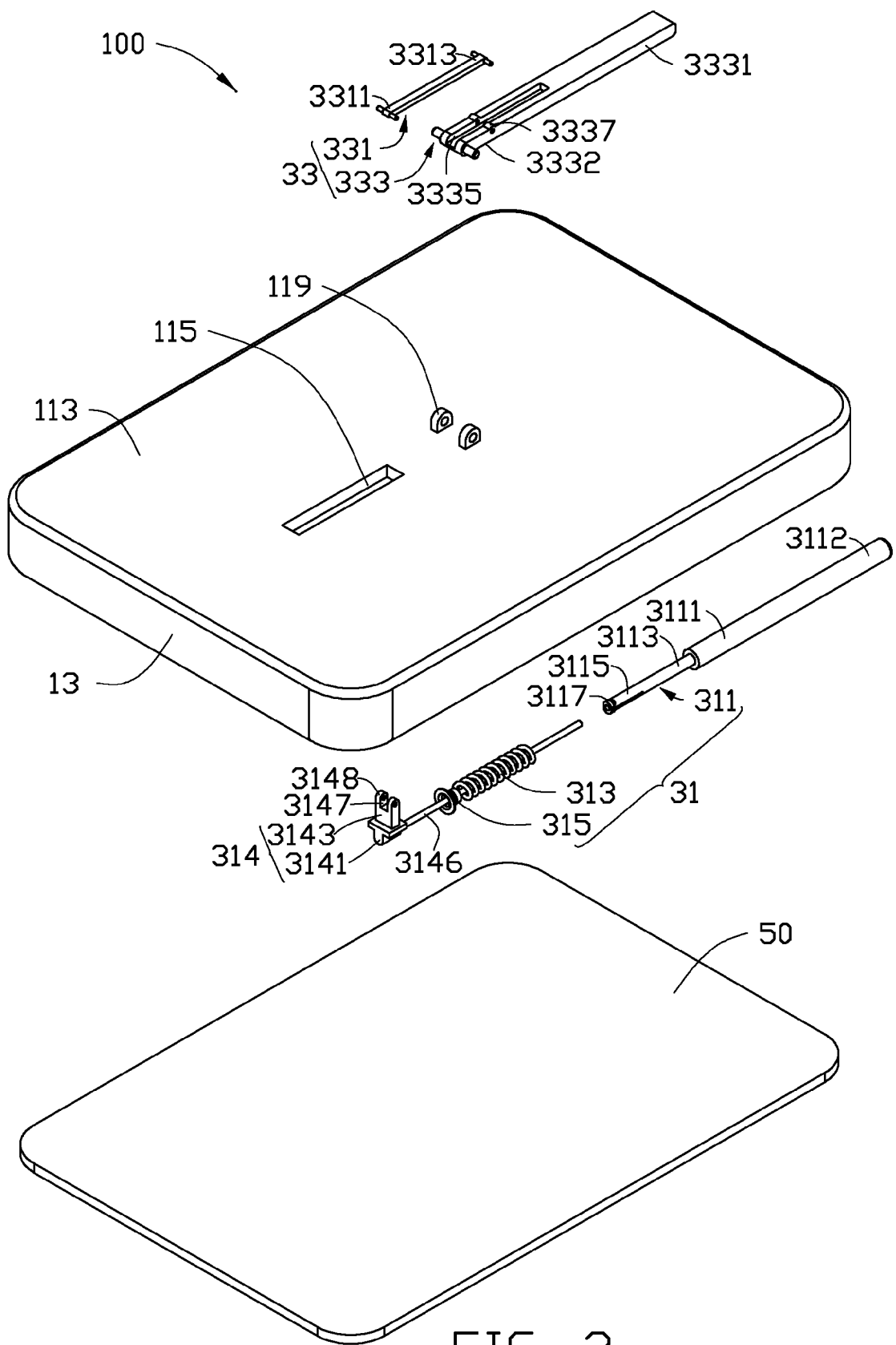
FIG. 2 is an exploded, isometric view of the electronic device of FIG. 1.

Referring to FIGS. 1 and 2, an embodiment of an electronic device 100 includes a housing 10, a support mechanism 30, and a display screen 50. The display screen 50 is mounted on the housing 10. The support mechanism 30 is movably and adjustably assembled to a bottom plate 11 of the housing 10, at away from the display screen 50, for supporting the housing 10. In the illustrated embodiment, the electronic device 100 is a panel computer with a plurality of touchable controls. The electronic device 100 can also be a digital photo frame, an MP3, a PDA, a mobile phone, or a liquid crystal display, for example.

Figure 3:
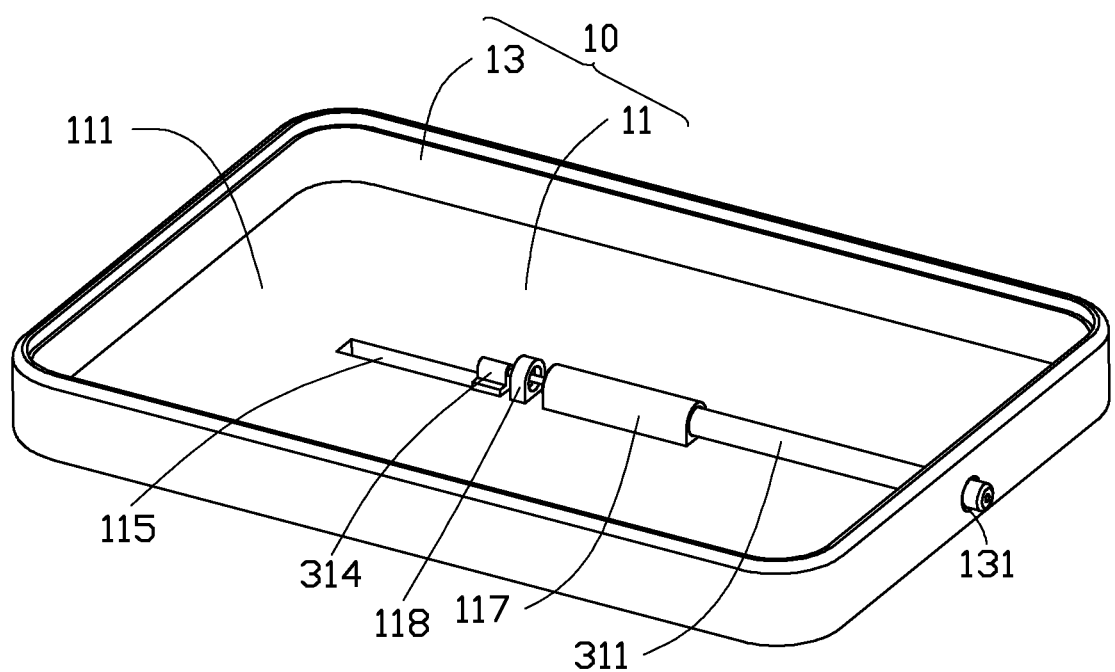
FIG. 3 is a partially assembled isometric view of the electronic device of FIG. 1.
Figure 4:
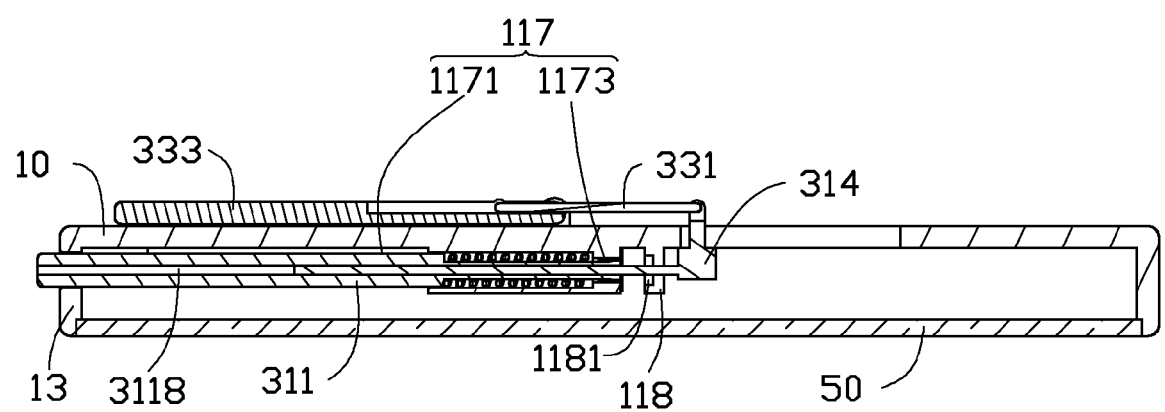
FIG. 4 is a cross-sectional view of the electronic device of FIG. 1, taken along a line IV-IV.

Also referring to FIGS. 3 and 4, the housing 10 includes the bottom plate 11 and a peripheral wall 13 extending from a peripheral edge of the bottom plate 11. In the illustrated embodiment, a cross section of the housing 10 is substantially U-shaped. The bottom plate 11 is a substantially rectangular board and includes an inner bottom surface 111 and an opposite outer support surface 113. A bar-shaped sliding slot 115 is defined through the bottom plate 11 longitudinally. A stopping portion 118 and a fixing sleeve portion 117 are separately formed on the inner bottom surface 111 along a longitudinal direction of the sliding slot 115. The stopping portion 118 is positioned adjacent to the sliding slot 115 and located between the sliding slot 115 and the fixing sleeve portion 117. A receiving slot 1171 is recessed from a first end of the fixing sleeve portion 117 away from the stopping portion 118. A sleeving hole 1173 is defined through a second end of the fixing sleeve portion 117, and is coaxial with the receiving slot 1171. A stepped through hole 1181 is defined through the stopping portion 118, and is coaxial with the sleeving hole 1173 of the fixing sleeve portion 117 and the sliding slot 115. Two hinged blocks 119 are oppositely formed on the outer support surface 113 of the bottom plate 11 corresponding to the fixing sleeve portion 117, and are positioned adjacent to one end of the sliding slot 115.

The peripheral wall 13 defines a mounting hole 131 facing toward the adjacent fixing sleeve portion 117 which is coaxial with the sleeving hole 1173. In the illustrated embodiment, the housing 10 is made of metal material, such as aluminum alloy, magnesium alloy, titanium alloy, or stainless steel.

Figure 5:
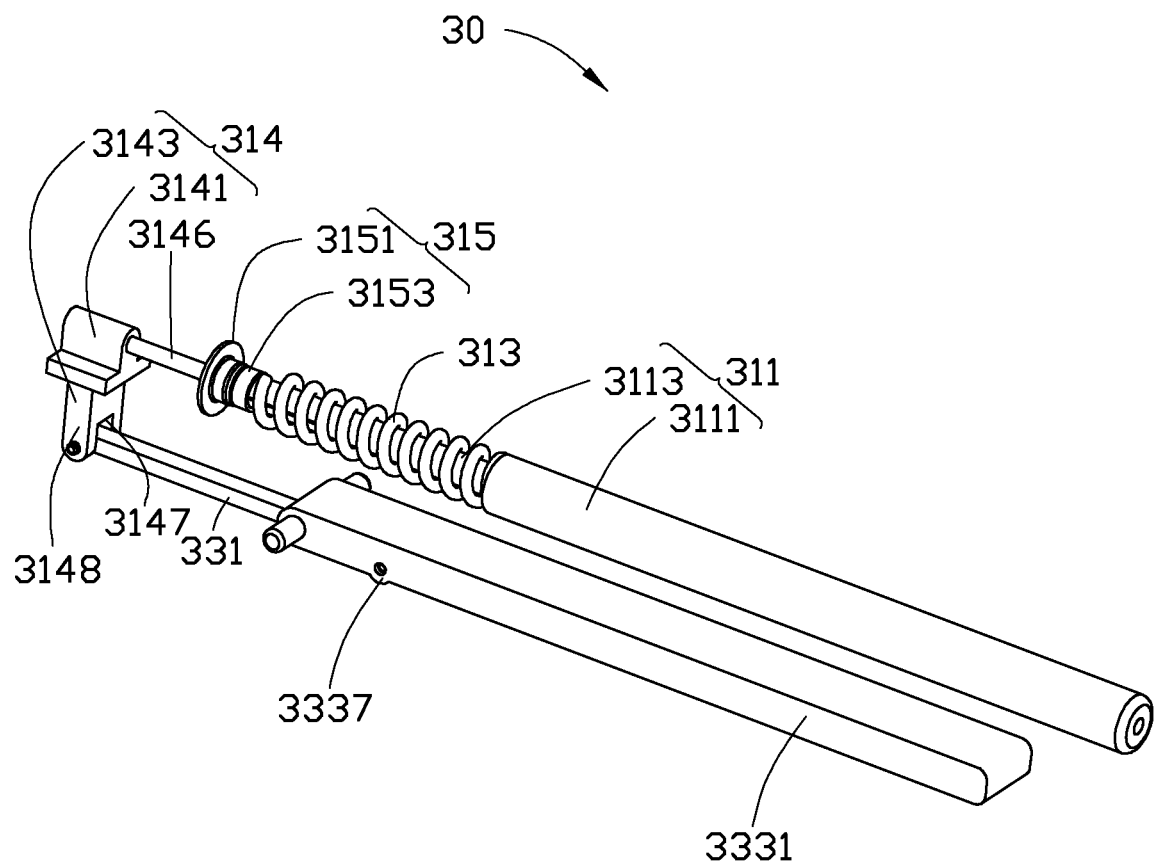
FIG. 5 shows an assembled isometric view of the support mechanism of the electronic device of FIG. 2.

Referring to FIGS. 2 and 5, the support mechanism 30 includes a retracting assembly 31 and a support assembly 33 hinging on the retracting assembly 31. The retracting assembly 31 is releasably mounted on the inner bottom surface 111 of the bottom plate 11 and received within the housing 10. The support assembly 33 is hinged with the retracting assembly 31 and the hinged blocks 119 of the outer support surface 113 of the bottom plate 11, and thereby provides support for the housing 10.

The retracting assembly 31 includes a retracting tube 311, an elastic member 313, a sliding member 314, and a bushing 315. The retracting tube 311 is coaxially and slidably assembled to the fixing sleeve portion 117. The retracting tube 311 includes a cylindrical main body 3111 and a cylindrical connecting body 3113 coaxially extending from a first end of the main body 3111. The main body 3111 has a diameter greater than that of the connecting body 3113. An assembling shaft hole 3118 is defined through the main body 3111 and the connecting body 3113 of the retracting tube 311. The connecting body 3113 is slidably received within the receiving slot 1171 and passes through the sleeving hole 1173 of the fixing sleeve portion 117. A second end of the main body 3111 aligns with and movably passes through the mounting hole 131 of the housing 10. In the illustrated embodiment, there are two bar-shaped clamping arms 3115 which oppositely extend from a distal end of the connecting body 3113, away from the main body 3111. A sleeving end 3117 is formed on a distal end of the two clamping arms 3115. In the illustrated embodiment, the sleeving end 3117 has a diameter slightly greater than that of the connecting body 3113.

Also referring to FIGS. 4 and 5, the elastic member 313 is sleeved on the connecting body 3113 of the retracting tube 311, and received within the receiving slot 1171 of the fixing sleeve portion 117. The ends of the elastic member 313 are respectively bound by the first end of the main body 3111 and a bottom wall of the receiving slot 1171. In the illustrated embodiment, the elastic member 313 is a coil spring.

The sliding member 314 is slidably assembled to the retracting tube 311 and sleeved with the connecting body 3113 of the retracting tube 311 by the bushing 315. In the illustrated embodiment, the sliding member 314 includes a base portion 3141 and a hinged portion 3143 formed on the base portion 3141. The base portion 3141 is slidably positioned above the sliding slot 115 of the bottom plate 11. A sliding post 3146 protrudes from an end surface of the base portion 3141 along a direction parallel to the inner bottom surface 111 of the bottom plate 11. The sliding post 3146 passes through the through hole 1181 of the stopping portion 118 and is slidably inserted into the shaft hole 3118 of the retracting tube 311. The hinged portion 3143 of the sliding member 314 passes through the sliding slot 115. A distal end of the hinged portion 3143 is exposed to the outside from above the outer support surface 113 of the bottom plate 11. A hinged slot 3147 is defined at the distal end of the hinged portion 3143 thereby forming two opposite hinged arms 3148.

The bushing 315 is slidably sleeved on the connecting body 3113 together with the elastic member 313, for adjusting a distance between the sliding member 314 and the retracting tube 311, and for fixedly holding the sliding post 3146 and the connecting body 3113 at a preset position. When the bushing 315 moves along the sleeving end 3117 of the connecting body 3113, the bushing 315 resists against the two clamping arms 3115 of the connecting body 3113 thereby tightly clamping the sliding post 3146 of the sliding member 314, such that the sliding member 314 and the retracting tube 311 are unable to slide against each other and so as to remain at a preset position. In the illustrated embodiment, the bushing 315 has a substantially hollow stepped shaft, and includes a resisting portion 3151 and a sleeving portion 3153 coaxially extending from one end of the resisting portion 3151 and sleeved on the connecting body 3113.

The support assembly 33 includes a connecting rod 331 and a supporting rod 333 hinged with the connecting rod 331. The connecting rod 331 is a substantially rectangular bar, and includes a first connecting end 3311, and a second connecting end 3313 opposite to the first connecting end 3311. The first connecting end 3311 is received within the hinged slot 3147, and hinges with the two hinged arms 3148 of the sliding member 314.

The supporting rod 333 is rotatably hinged to the two hinged blocks 119 formed on the outer support surface 113 of the bottom plate 11, and further hinges with the second connecting end 3313 of the connecting rod 331. In the illustrated embodiment, the supporting rod 333 includes a support body 3331 having a pivotal end 3332. The pivotal end 3332 of the supporting rod 333 is positioned between the two hinged blocks 119 and hinges with the two hinged blocks 119. A receiving slot 3335 is defined through the pivotal end 3332 of the support body 3331. Two pivotal portions 3337 are separately formed on the support body 3331, adjacent to the pivotal end 3332, and positioned at two sides of the receiving slot 3335. The second connecting end 3313 of the connecting rod 331 is received within the receiving slot 3335 and hinges with the two pivotal portions 3337 of the supporting rod 333.

The display screen 50 is mounted on the housing 10 and fixed with a top portion of the peripheral wall 13, away from the bottom plate 11.

In assembly, the retracting tube 311 is slidably assembled to the fixing sleeve portion 117 of the housing 10, and positioned coaxially with the fixing sleeve portion 117 and the stopping portion 118. The second end of the main body 3111 of the retracting tube 311 passes through the mounting hole 131 and is partially exposed to the outside of the housing 10. The bushing 315 together with the elastic member 313 is sleeved on the connecting body 3113 of the retracting tube 311, and received within the fixing sleeve portion 117. The elastic member 313 is fitted between the first end of the main body 3111 and the bushing 315. The sliding member 314 is slidably assembled to the retracting tube 311 with the sliding post 3146 slidably inserted into the assembling shaft hole 3118 of the connecting body 3113. The hinged portion 3143 of the sliding member 314 passes through the sliding slot 115 and is partially exposed to the outside of the housing 10. The first connecting end 3311 of the connecting rod 331 is hinged to the two hinged arms 3148 of the sliding member 314. The supporting rod 333 is rotatably hinged to the two hinged blocks 119 formed on the outer support surface 113, and the second connecting end 3313 is hinged to the pivotal portions 3337 of the supporting rod 333. Finally, the display screen 50 is mounted on the housing 10 and positioned above the bottom plate 11, to complete the assembly of the electronic device 100.

Figure 6:
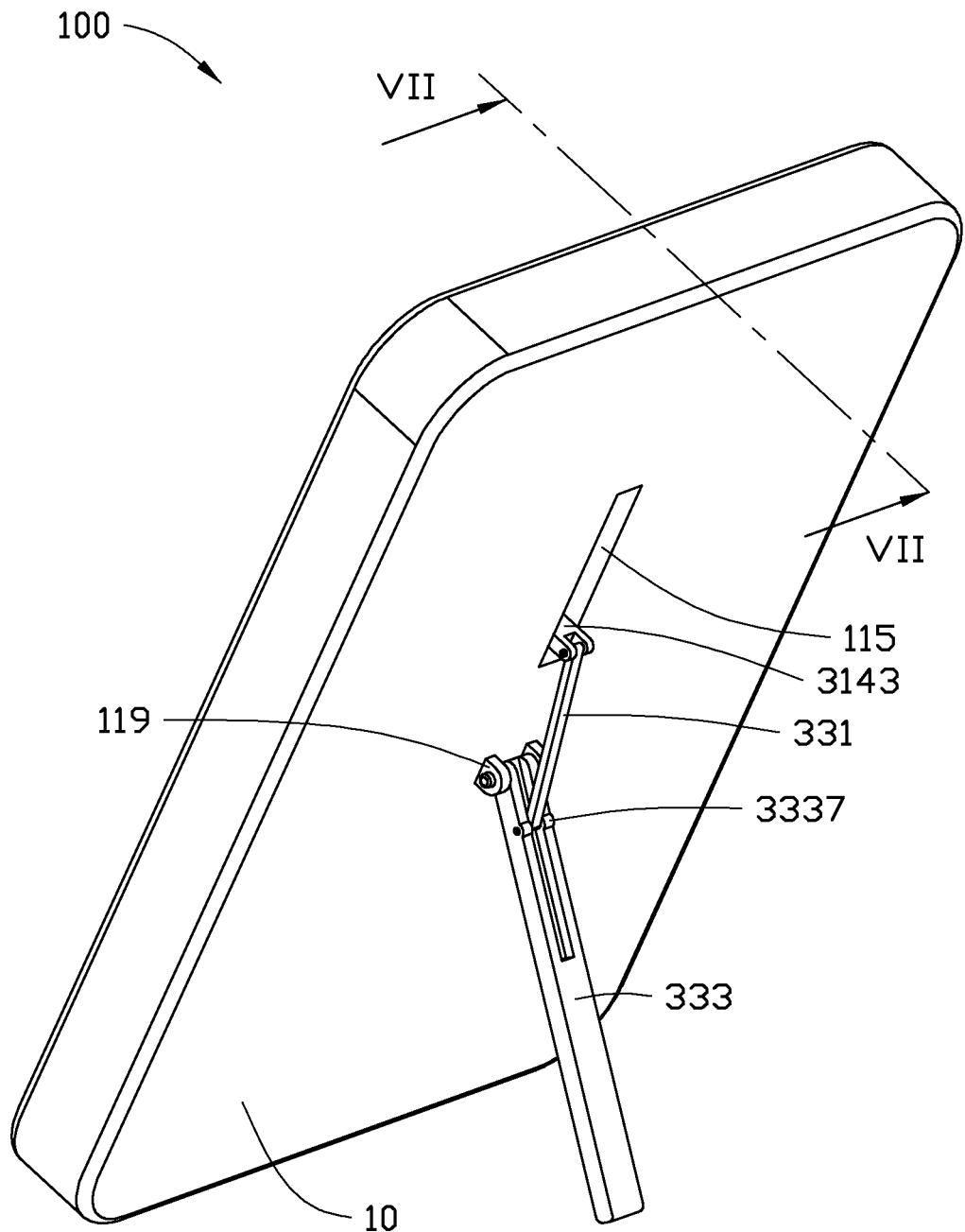
FIG. 6 shows the electronic device of FIG. 1 with the support mechanism in use.
Figure 7:
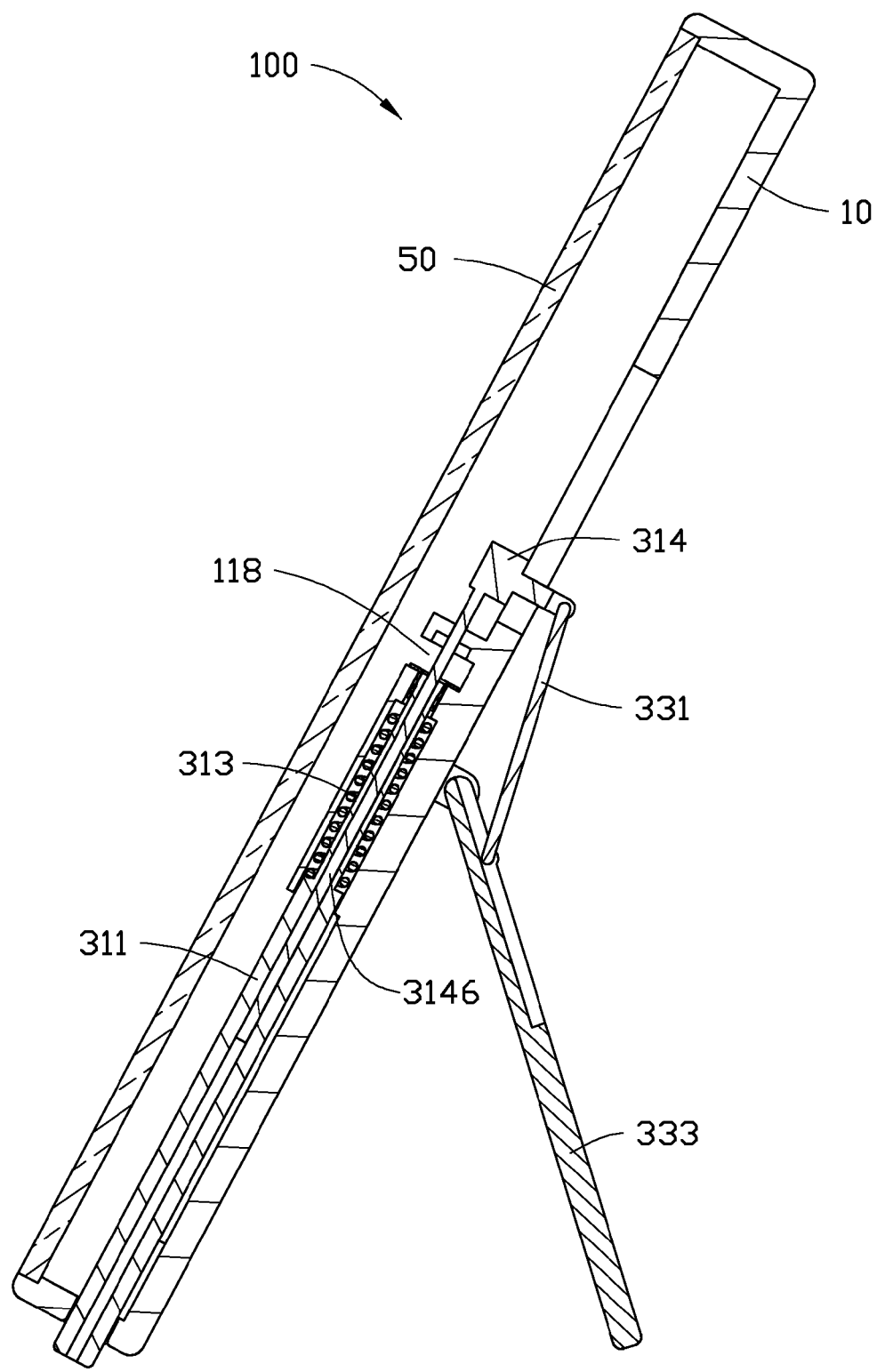
FIG. 7 shows a cross-sectional view of the electronic device of FIG. 6, taken along a line VII-VII.

Also referring to FIGS. 6 and 7, in use, the second end of the main body 3111 is pressed toward the stopping portion 118, the retracting tube 311 together with the sliding member 314 slides toward the stopping portion 118. Meanwhile, the connecting rod 331 is driven to move relative to the housing 10, and the supporting rod 333 is driven to rotate relative to the housing 10. When the sleeving end 3117 together with the bushing 315 reaches the stopping portion 118, the resisting portion 3151 of the bushing 315 resists against the stopping portion 118. Keeping pressure on the second end of the main body 3111 or rotating the supporting rod 333 toward the sliding slot 115 side to disengage the bushing 315 from the sleeving end 3117, the first end of the main body 3111 pushes against the elastic member 313, the sleeving end 3117 then disengages from the bushing 315 thereby releasing the sliding post 3146. The angle formed by the supporting rod 333 and the housing 10 is capable of being adjusted by rotating the supporting rod 333 and pressing the second end of the main body 3111, according to actual need. During the angle adjusting process, the sliding member 314 is slid along the sliding slot 115 of the housing 10. When the supporting rod 333 reaches a preset angle, the main body 3111 is released, and then the retracting tube 311 slides back toward the fixing sleeve portion 117 under an elastic force of the elastic member 313. The sleeving portion 3153 of the bushing 315 is finally tightly sleeved on the sleeving end 3117 of the retracting tube 311, the two clamping arms 3115 of the connecting body 3113 tightly clamp the sliding post 3146 of the sliding member 314, such that the supporting rod 333 is locked and remains at the preset angle relative to the housing 10.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising: a housing comprising a bottom plate and a peripheral wall; a display screen mounted to the housing and positioned above the bottom plate; and a support mechanism movably and adjustably assembled to the bottom plate of the housing, away from the display screen; the support mechanism comprising: a retracting assembly releasably mounted to the bottom plate and comprising a retracting tube, a sliding member slidably assembled with the retracting tube and a bushing, the retracting tube slidably sleeved on the sliding member and received within the housing; the bushing slidably sleeved on the retracting tube for adjusting a distance between the sliding member and the retracting tube, and fixedly holding the sliding member and the retracting tube at a preset position; and a support assembly rotatably hinged to the bottom plate of the housing, and further hinged with the sliding member by a connecting rod for supporting the housing at a plurality of viewing angles.

2. The electronic device of claim 1, wherein the retracting tube comprises a main body and a connecting body coaxially extending from a first end of the main body, a second end of the main body of the retracting tube passes through the peripheral wall and exposed to the outside of the housing; an end portion extending from the connecting body and positioned away from the main body is slidably sleeved on the sliding member, the retracting assembly further comprises an elastic member sleeved on the connecting body of the retracting tube together with the bushing, two ends of the elastic member respectively elastically resist against the first end of the main body and the bushing.

3. The electronic device of claim 2, wherein the bottom plate defines a sliding slot; the peripheral wall defines a mounting hole positioned on a length direction of the sliding slot; the sliding member comprises a base portion, a hinged portion formed on the base portion, and a sliding post protrudes from an end surface of the base portion, one end of the retracting tube passes through the mounting hole and exposed to the outside of the housing, the other end of the retracting tube is slidably sleeved with the sliding post; the hinged portion of the sliding member passes through the sliding slot and hinged with the support assembly.

4. The electronic device of claim 3, wherein the housing further comprises a fixing sleeve portion formed on an inner bottom surface of the bottom plate along a longitudinal direction of the sliding slot, and positioned between the sliding slot and the mounting hole; the retracting tube is coaxially and slidably assembled to the fixing sleeve portion, the retracting tube comprises a main body, a connecting body coaxially extending from a first end of the main body, and an assembling shaft hole defined through the main body and the connecting body, the connecting body is sleeved with the sliding post of the sliding member; a second end of the main body aligns with and movably passes through the corresponding mounting hole of the housing.

5. The support mechanism of claim 4, wherein the retracting tube further comprises two clamping arms oppositely extend from a distal end of the connecting body, and a sleeving end formed on the distal end of the two clamping arms; the bushing is slidably sleeved on the connecting body together with the elastic member and is capable of being tightly sleeved on the sleeving end of the connecting body, such that the sliding post of the sliding member is tightly clamped by the two clamping arms for prevent the sliding post from sliding relative to the retracting tube; the elastic member is sleeved on the connecting body and elastically sandwiched between the bushing and the first end of the main body.

6. The electronic device of claim 5, wherein the housing further comprises a stopping portion formed on inner bottom surface of the bottom plate and positioned between the sliding slot and the fixing sleeve portion, the stopping portion defines a through hole coaxial with the shaft hole of the retracting tube; the sliding post passes through the through hole of stopping portion and is inserted into the fixing sleeve portion to slidably sleeve with the connecting body of the retracting tube.

7. The electronic device of claim 4, wherein the fixing sleeve portion defines a receiving slot away from the sliding slot end and a sleeving hole coaxial with the receiving slot, the connecting body is slidably received within the receiving slot and passes through the sleeving hole of the fixing sleeve portion.

8. The electronic device of claim 5, wherein the housing further comprises two hinged blocks oppositely formed on the outer support surface of the bottom plate, and positioned adjacent to a same end of the sliding slot; the support assembly comprises a connecting rod and a supporting rod, two ends of the connecting rod are respectively hinged with the supporting rod and the hinged portion of the sliding member; the supporting rod is further rotatably hinged to the two hinged blocks of the housing.

9. An electronic device, comprising: a housing comprising a bottom plate and a peripheral wall, the bottom plate defining a sliding slot, the peripheral wall defining a mounting hole positioned on a length direction of the sliding slot; a display screen mounted to the housing and positioned above the bottom plate; and a support mechanism movably and adjustably assembled to the bottom plate of the housing, away from the display screen; the support mechanism comprising: a retracting assembly releasably mounted to the bottom plate and comprising a retracting tube, a sliding member, and a bushing, wherein the retracting tube is received in the housing, passes through the mounting hole, and is exposed out of the housing; a projection of the retracting tube on the bottom plate and the sliding slot are aligned in line; the sliding member is slidably assembled to the retracting tube, passes through the sliding slot and exposed out of the housing; the bushing is slidably sleeved on the retracting tube for adjusting a distance between the sliding member and the retracting tube, and fixedly holding the sliding member and the retracting tube at a preset position; and a support assembly rotatably hinged to the bottom plate of the housing, and further hinged with the sliding member for supporting the housing at a plurality of viewing angles.

* * * * *